United States Patent [19]

Alexander et al.

[11] Patent Number: 4,553,869
[45] Date of Patent: Nov. 19, 1985

[54] BUCKLING ONE WAY CLUTCH

[75] Inventors: Douglas E. Alexander; James F. Holland, both of Raleigh; Herbert G. Leonard, Louisburg; Alvin R. Reed, Raleigh, all of N.C.

[73] Assignee: International Business Machines Corp., Armonk, N.Y.

[21] Appl. No.: 531,111

[22] Filed: Sep. 12, 1983

[51] Int. Cl.⁴ .................................................. B41J 19/76
[52] U.S. Cl. ......................... 400/568; 188/82.1; 192/41 R; 400/222; 400/234; 400/242; 400/340; 400/571; 400/577; 400/617; 400/618; 400/634; 400/569
[58] Field of Search ............ 400/222, 225, 227, 227.2, 400/232, 234, 235.1, 242, 338, 340, 568, 571, 577, 614, 614.1, 617, 618, 634, 569; 188/82.1, 82.6, 82.7, 82.77, 82.8; 192/41 R, 45.1, 41 A, 45.2, 46, 12 B; 137/625.11

[56] References Cited

U.S. PATENT DOCUMENTS

| 37,953 | 5/1863 | Dickson | 192/41 X |
|---|---|---|---|
| 2,075,130 | 3/1937 | Osterholm | 192/41 A |
| 2,601,911 | 7/1952 | Takats | 192/41 R |
| 2,735,526 | 2/1956 | Gemmel | 192/46 X |
| 2,787,357 | 4/1957 | Segui | 400/614 |
| 3,033,481 | 5/1962 | Wolk | 400/614 X |
| 3,130,826 | 4/1964 | Davis et al. | 192/12 B |
| 3,200,918 | 8/1965 | Horn | 192/46 |
| 3,386,122 | 6/1968 | Mathison | 192/46 X |
| 3,409,113 | 11/1968 | McLean | 400/227 |
| 3,429,523 | 2/1969 | Busch | 400/618 X |
| 3,459,390 | 8/1969 | Hugel | 192/46 X |
| 3,486,597 | 12/1969 | Carlton | 192/46 |
| 3,589,486 | 6/1971 | Kelch | 192/46 |
| 3,814,223 | 6/1974 | Toulier | 192/46 |
| 3,923,132 | 12/1975 | Van Der Klugt | 192/45.1 |
| 3,928,862 | 12/1975 | Ivester et al. | 192/46 X |
| 3,946,843 | 3/1976 | Downs | 192/45.1 |
| 3,990,564 | 11/1976 | Crump et al. | 400/222 |
| 4,044,868 | 8/1977 | Berger | 192/41 A |
| 4,346,729 | 8/1982 | Franz | 137/625.11 X |
| 4,346,749 | 8/1982 | Singletary et al. | 188/82.7 X |
| 4,347,008 | 8/1982 | Jagodzinski et al. | 400/234 X |
| 4,352,710 | 10/1982 | Makley | 192/46 X |

FOREIGN PATENT DOCUMENTS

| 456026 | 4/1949 | Canada | 192/45.1 |
|---|---|---|---|
| 756885 | 12/1933 | France | 192/45.1 |
| 0625070 | 9/1978 | U.S.S.R. | 192/46 |
| 0859708 | 9/1981 | U.S.S.R. | 192/46 |

Primary Examiner—Ernest T. Wright, Jr.
Attorney, Agent, or Firm—Joscelyn G. Cockburn

[57] ABSTRACT

A mechanical torque transmitting apparatus such as a one-way clutch which includes two distinct sets of flexural arms (primary and auxiliary) and a cylindrical engagement surface. The primary flexural arm is adapted to be in edgewise continuous engagement with the cylindrical surface. Preferably, the primary flexural arm has a long, straight, narrow cross-section area and applies a relatively low force against the cylindrical surface when said surface is rotating in a free-wheeling direction. In the non free-wheeling direction, the force against the cylindrical surface increases until the rotational forces overcome and buckle the primary flexural arm whereupon the auxiliary flexural arm is brought into contact with the cylindrical surface to resist further rotation.

11 Claims, 5 Drawing Figures

FIG. 3

BUCKLING ONE WAY CLUTCH

BACKGROUND OF THE INVENTION

(1) Field of the Invention

The present invention generally relates to a mechanical torque transmitting device and more particularly to clutches which allow rotation in one direction and resist rotation in the opposite direction.

(2) Prior Art

The use of one-way clutches for controlling the motion of one or more movable members is well known in the prior art. Such clutches generally allow the controlled member to rotate freely in one direction, called the free-wheeling direction, but resist motion in the non free-wheeling direction. The use of such devices is so well known that a detailed description of each of the prior art, to be listed hereinafter, is merely cumulative and adds nothing to enlighten a skilled artisan regarding the prior art. In view of this notoriety, only a listing of the prior art is given without a detailed description of each of the cited references. U.S. Pat. Nos. 2,075,130; 2,601,911; 3,130,826; 3,200,918; 3,386,122; 3,429,523; 3,459,390; 3,486,597; 3,589,486; 3,814,223; 3,928,862; 3,946,843; 4,044,868; and 4,346,729 are examples of the prior art clutches.

Of the cited prior art, U.S. Pat. Nos. 3,589,486 and 3,946,843 are representative of the various types of prior art clutches. More specifically, U.S. Pat. No. 3,589,486 represents the so-called toothed pawl type clutches while U.S. Pat. No. 3,946,843 represents the non-toothed pawl.

The toothed pawl type clutches (exemplified by U.S. Pat. No. 3,589,486) has an annular outer member with inner ratchet teeth and an inner member having a plurality of resilient arms with pawl-end portions which resiliently engage the ratchet teeth and recesses of the outer member. Each arm has an elongated thin portion extending substantially in a circumferential direction along the ratchet teeth so that the arms can be bent by the ratchet teeth in radial direction during relative turning of the inner and outer members in one direction, but slippage-free and resiliently couple the inner and outer members during relative movement in the opposite direction due to the fact that the ratchet teeth apply pressure in circumferential direction to the circumferentially extending arm portions.

U.S. Pat. No. 3,946,843 represents the non-toothed pawl type clutches. The clutch consists of a cylindrical engagement surface and one or more disc elements carrying members extending therefrom and flexibly attached thereto. The members are adapted to edgewise frictionally engage the cylindrical surface so that relative motion between the cylindrical surface and the disc elements in one direction causes frictional slippage of the members and relative motion in the opposite direction causes light driving engagement.

Other types of clutches such as roller, spring, locking arm and metal strap are well represented in the above enumerated patents. However, the existence and theory of operation of these clutches are well known and a further description will not be given.

Although the above prior art clutches work well for their intended purpose, they are plagued by several problems. One of the general problems which affects the prior art cluthes is that these clutches consist of a single set of arms which is used to meet all requirements of locking in one direction and free wheeling in the other. As used herein, a set may include one or more members. The requirements for each of the two operations are inapposite. For example, in the free-wheeling direction, the locking force between the set of arms and the rotating members should be at a minimal value. Conversely, in the non free-wheeling direction, the force should be at a maximum value. Because of these inapposite requirements, it is difficult to maximize the allowable locking force before breakage and it is difficult to minimize the free-wheeling resisting force.

Other general problems which beset the prior art clutches are that these clutches consist of numerous working parts, difficult to manufacture, low angular resolution, high free-wheeling friction, and low allowable lock force.

SUMMARY OF THE INVENTION

It is therefore the general purpose of the present invention to provide a more efficient and low-cost clutch than was heretofore possible.

A more specific object is to provide a clutch having low friction, in the free-wheeling direction, and high resolution in the non free-wheeling direction.

Another specific object is to provide a clutch assembly having low friction, high resolution with relatively low backup loads and relatively high loading torque with high backup loads.

The high resolution anti-backup clutch apparatus includes a substantially circular engagement surface and a buckling assembly.

The buckling assembly includes a hub or center member with a primary flexural arm and a secondary flexural arm extending therefrom. The primary flexural arm has a long, narrow straight cross-section and is in continuously edgewise frictional engagement with the circular surface. The frictional engagement is relatively low when the circular surface rotates in a free-wheeling direction. In the non free-wheeling direction the primary flexural arm provides a relatively high torque which resists the normal backup torque and prevents the circular surface from rotating in the non free-wheeling direction. When the backup torque exceeds the torque capacity of the primary flexural arms, the arms buckle in such fashion as to deflect from the surface. The secondary flexural arms now engages the surface and provides a much greater resistance to the backup torque.

By using distinct and different groups of flexural arms to contact the rotating surface sequentially, a clutch with low free-wheeling resisting force, relative high locking forces and fewer parts is provided.

In one embodiment of the invention, the primary and secondary flexural arms are configured in a tripod arrangement. The tripod arrangement provides better stability for the clutch assembly.

The foregoing and other features and advantages of the invention will be more fully described in the accompanying drawings.

DESCRIPTION OF THE DRAWINGS

FIG. 3 is a chart showing design characteristics for different types of primary buckling arms.

DETAILED DESCRIPTION OF THE PREFERRED EMBODIMENT

The invention to be described hereinafter is intended to be used in any environment where a clutch assembly is needed. The present invention works well in a printer environment and as such will be described for use in that environment. However, this should not be construed as a limitation on the scope of the present invention since it is within the skill of one skilled in the art to use the invention as is or with obvious modifications to fit into other environments.

Figure 1:
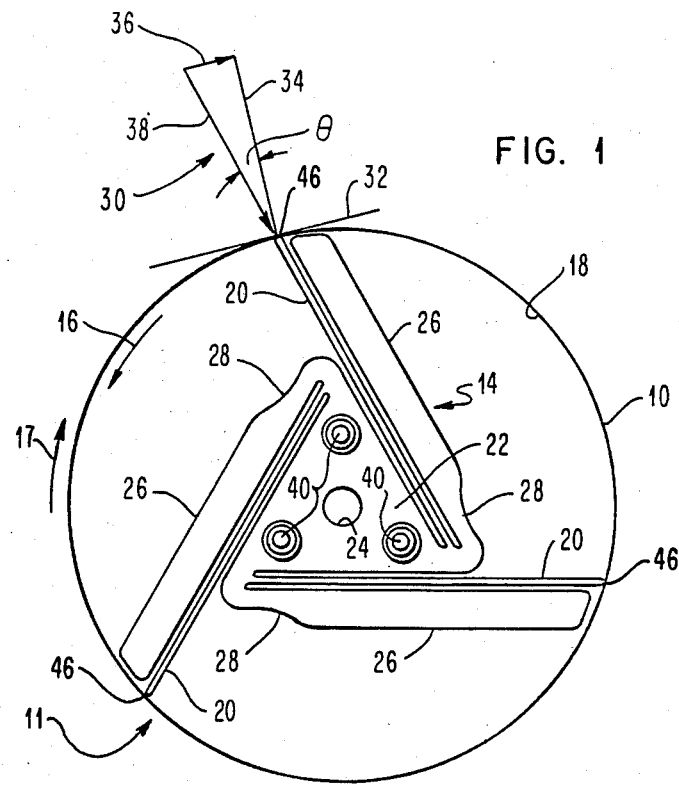
FIG. 1 shows a side view of the clutch assembly according to the teaching of the present invention.

FIG. 1 shows a side view schematic of the clutch assembly 11 according to the teaching of the present invention. The clutch assembly 11 comprises a movable section identified by numeral 10 and a fixed section identified by numeral 14. In operation the movable section 10 rotates relative to the fixed section 14. The interrelationship between the fixed section 14 and the movable section 10 is such that when the movable section 10 is rotating in the free-wheeling direction identified by arrow 16, the frictional forces between the sections 10 and 14, respectively are minimal. However, when the movable section 10 attempts to move in the opposite direction 17, the frictional forces between the sections 10 and 14 increases and backward motion is prevented.

The movable section 10 (to be described in detail hereinafter) is formed into a ring-like structure with an engagement surface identified by numeral 18. The ring-like structure is fabricated from hard rubber or plastic and the engagement surface 18 is integral to it. The engagement surface 18 may be of the same material as the rest of the ring-like structure or of a different material such as urethane so as to improve traction or wear characteristics. Preferably, the ring-like structure would be molded. When a combination of materials is used for the ring-like structure, the materials would be bonded together by being molded in a two-shot operation or by being mechanically attached. Of course, other methods can be used for depositing the coating without departing from the scope of the present invention. As will be described hereinafter, the purpose of the urethane coating is to increase the coefficient of friction between the primary detent buckling arm 20 and the engagement surface 18. The increased friction ensures that the buckling arms 20 will lock when the rotational torque tends to rotate the ring-like structure in the non free-wheeling direction.

Still referring to FIG. 1, the fixed section 14 is comprised of a triangular shaped hub member identified by numeral 22 and a plurality of arms identified by numerals 20 and 26 radiating from the triangular shaped hub member 22. An opening identified by numeral 24 is fabricated in the center of the triangular shaped hub member 22. The opening 24 forms the center of the clutch assembly 11. The opening 24 is used for mounting the clutch assembly 11 to the frame 23 (FIG. 2) of a printer system. Two sets of arms 20 and 26 radiate from the triangular shaped hub member 22. One set is comprised of primary detent buckling arms 20. The other set is comprised of the auxiliary detent hinged arms 26. The triangular hub member 22 with its primary detent buckling arms 20 and its auxiliary detent hinged arms 26 forms a tripod arrangement of three evenly spaced buckling and hinged arms 20, 26 respectively. The tripod arrangement equalizes the radial forces acting on the clutch assembly 11 and maximizes stability.

The primary buckling arm 20 has a long, narrow cross-section and rides continuously against the engagement surface 18. As stated previously, the interaction between the surface 18 and the primary detent buckling arm 20 is such that the frictional force in the direction of normal rotation is minimized. Because of the low frictional force, the free-wheeling torque (for driving the takeup spool assembly 60) is low. The rigidity of the primary buckling arms 20 is made low in order to ensure the use of a low free-wheeling torque. When the reverse torque exceeds a predetermined value, the primary detent buckling arms 20 buckle in a controlled manner. In the preferred embodiment of this invention the arms 20 buckle when the tangential force from the rotating member or movable section 10 exceeds 1/10 pound. Buckling occurs along the lengthwise dimension of the buckling arms 20. Such buckling of the primary buckling arms 20 is a consequence of the relatively long and narrow cross-sectional area.

Still referring to FIG. 1, auxiliary detent hinged arms 26 run parallel to the primary buckling arms 20 and are connected to the triangular shaped hub member 22 by hinged sections identified by numeral 28. The auxiliary arms 26 are elongated but with a sturdier cross-sectional area than the primary buckling arms 20. The ends of the auxiliary detent arms 26 are positioned relative to engagement surface 18. In normal operation a space exists between the engagement surface 18 and the ends of said auxiliary hinged arms 26.

In operation, when the primary buckling arms 20 are overcome (that is, buckled) due to excessive torque, the induced bow causes the primary buckling arms 20 to bear against the auxiliary hinged arms 26 and forces them against the engagement surface 18. When engaged in this manner, the force which the auxiliary hinged arms 26 are capable of resisting is much greater than the force which the primary buckling arms 20 alone are capable of resisting. In the preferred embodiment of this invention, the auxiliary hinged arms 26 are designed to resist a force of ten pounds tangentially from the rotating member 10. When the force exceeds the designed limit, the hinged arms 26 will collapse at hinged area 28, respectively. It should be noted that the auxiliary hinged arms 26 can be designed to resist any backward torque. Variation in the backward torque capacity is a mere matter of design choice. The important relationship between the primary buckling arms 20 and auxiliary hinged arms 26 is that buckling of primary buckling arms 20 will cause auxiliary hinged arms 26 to engage and increase the torque capacity of the clutch assembly 11.

Still referring to FIG. 1, a force triangle 30 with its apex contacting the outside surface of the movable section 10 is shown. Line 32 is tangent to the movable section 10 at the point whereat the apex contacts said movable section 10. The triangle 30 is helpful in understanding the critical relationship between the engagement surface 18 and the primary buckling arms 20 which continuously ride against the engagement surface 18. It ought to be noted that the continuous engagement between buckling arm 20 and engagement surface 18 results in a high resolution anti-backup clutch. However, in order to provide a clutch having long life the forces between the movable member 10 and the fixed member or section 14 must be minimal in the free-wheeling direction. Likewise, in the non free-wheeling direction the forces must be maximized to resist reverse torque. To this end, the angle Å is very critical and must be designed so that the interaction between the buckling arms 20 and the engagement surface 18 meets certain requirements.

In FIG. 1 the force triangle 30 comprises side 34 which is normal to tangent line 32. The side 36 represents the imposed or backup force which tends to drive the movable section 10 in the non free-wheeling direction. Side 38 closes the triangle 30 and is the resultant force. In operation, the auxiliary hinged arms 26 engage the engagement surface 18 if the resultant force is greater than the critical buckling load of the primary buckling arms 20. The angle Å is the angle which is formed between the primary buckling arm 20 and a radius drawn from the center of the movable section 10. It should be noted that the preferred geometric configuration of the movable section 10 is that of a circle. As a general statement, the angle Å should not be too small. If it is, the force which the primary buckling arms 20 exert on engagement surface 18 is very high and creates unnecessary wear on the parts. Such high forces tend to lessen the life of the clutch assembly 11. Generally, a larger angle is preferred, providing that the primary buckling arms 20 will lock in the non free-wheeling direction. As a general design guide, the angle between the buckling arms 20 and engagement surface 18 should be such that the tangent of the angle is less than the minimum coefficient of friction between the engagement surface 18 and the buckling arm 20. This would suggest that for proper operation the coefficient of friction should be relatively high.

Figure 2:
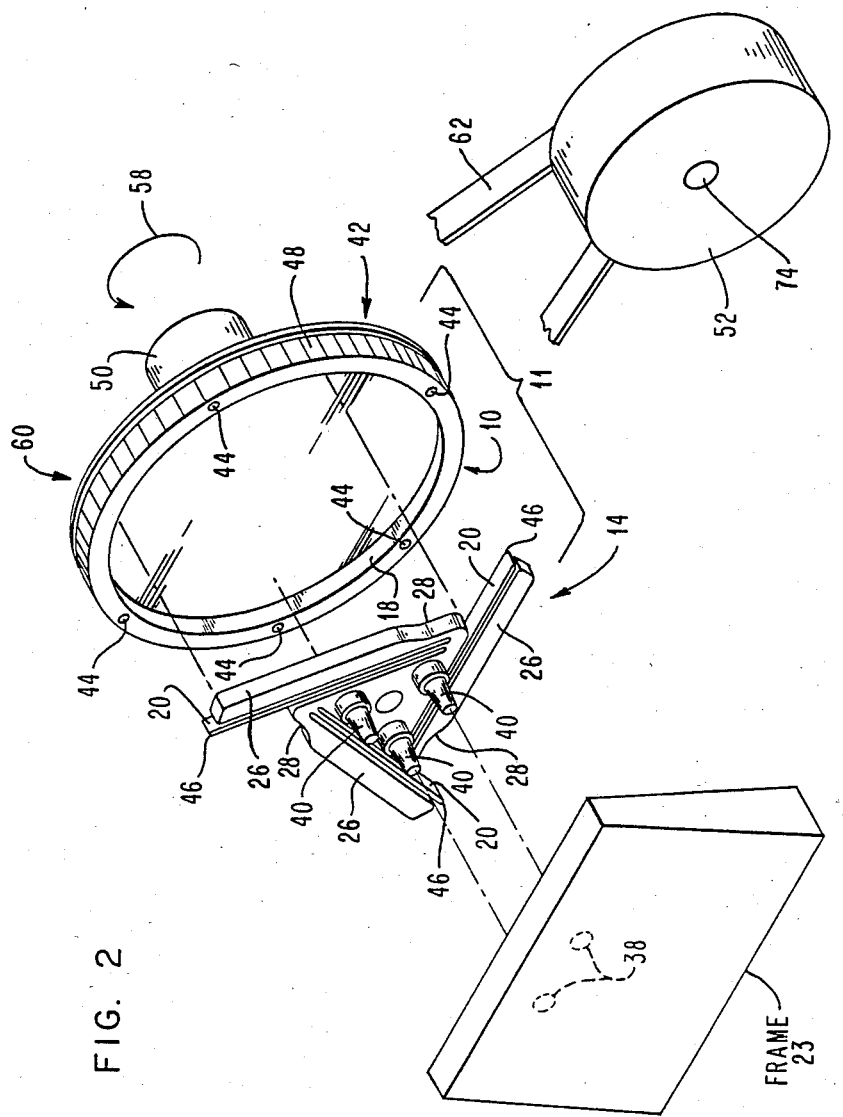
FIG. 2 shows a partial configuration for a printer in which the clutch assembly controls the motion of the takeup spool.

FIG. 2 shows the clutch assembly 11 coupled to the takeup spool assembly 60 of a point of sale printer. Such printers are well known in the prior art and therefore only sections which are necessary to explain the benefits of the present invention are shown and described. The printer includes a frame member identified by numeral 23. A plurality of openings identified by numerals 38 are fabricated into the frame 23. As stated previously, the one-way clutch assembly 11 comprises of a movable section 10 and fixed section 14. The fixed section 14 has a triangular shape hub member 22 upon which a plurality of mounting pins identified by numerals 40 are fabricated. The mounting pins 40 interact with holes 38 for mounting the fixed section 14 against the frame 23. It should be noted that the mounting pins 40 demonstrate one means of mounting the fixed section 14 of the clutch assembly 11 to the frame 23. It is well within the skill of the art to devise other mounting means without deviating from the scope of the present invention.

Figure 4:
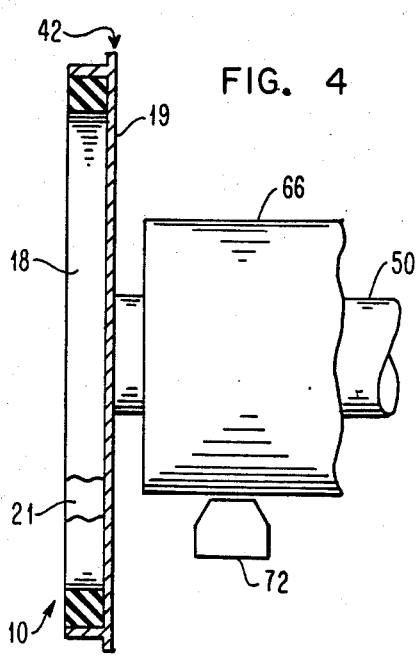
FIG. 4 shows a cross-sectional view of a pulley and a non-cross-sectional view of a roll of paper mounted on a spool with a print head for printing on the paper.

As stated previously, the fixed section 14 is a flat pancake tripod arrangement comprising of primary buckling arms 20 and hinged secondary arms 26 extending from the hub portion or member 22. Movable section 10 is ring-shaped or circular and is mounted inside a cavity formed on one surface of pulley 42. Flat surface 19 is on the opposite side of the cavity 21 (FIG. 4) and faces paper roll 66 (FIG. 4). A plurality of fastening means identified by numerals 44 attach the circular member or movable section 10 to the pulley 42. Although a plurality of pins or fastening means 44 are shown for mounting the circular member 10 to the pulley 42, this should not be construed as a limitation on the scope of the present invention since it is within the skill of one skilled in the art to devise other fastening means without departing from the scope of this invention.

As is shown more clearly in FIG. 1, in the assembled form the fixed section 14 of the clutch mechanism is fitted inside of the circular member 10. The surfaces identified by numeral 46 ride in continuous contact with engagement surface 18. A geared surface with a plurality of ridges and identified by numeral 42 is formed on the edges of pulley 42. A pulley belt 62 having an internal surface which positively engage the geared surface 48 rides on the pulley 42.

Figure 5:
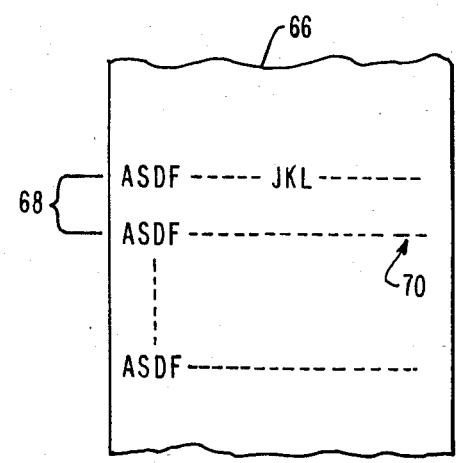
FIG. 5 shows a printed section of paper unrolled from the roll of paper.

A spool 50 is rigidly connected to pulley 42. The spool 50 is adapted to support a roll of paper 66 (FIG. 4). The combination (that is pulley 42 and spool 50) may be used as the takeup assembly 60 in a point of sale printer. In that environment a high resolution stepper motor identified by numeral 52 is directly coupled through a belt 62 to the spool 50. Opening 74 is provided for mounting stepper motor 52. When the motor 52 is energized to move the spool 50 in the free-wheeling direction identified by numeral 58. Stepwise advancement of the motor 52 advances the paper 66 an incremental distance 68 (FIG. 5) to present a new print line 70 to the print head 72. At times when the motor 52 is not used to drive the takeup spool 50 it is revolving in the opposite direction to perform another task (ribbon drive). A roller one-way clutch assembly 11 inside the pulley 42 on the motor shaft (not shown) allows the motor 52 to turn backwards to run the ribbon drive (not shown) without turning the paper spool 50 backwards. Low but existing free-wheeling torque through the roller one-way clutch assembly 11, as well as tension between the supply spool (not shown), and the takeup spool 50 tends to turn the takeup spool 50 backwards after the takeup spool 50 has been incremented for a line of print. The takeup spool 50 must be prevented from backing up. When the clutch assembly 11 is fitted in the back side of the takeup spool assembly 60, the clutch assembly 11 prevents such backward motion. Essentially, the primary buckling arms 20 riding in continuous contact with the engagement surface 18 provides a high resolution clutch assembly 11 which resists such backward forces. Should the forces exceed the critical buckling force, the high resolution characteristic of the clutch assembly 11 is of negligible consequence and the secondary detent arms 26 coact with the engagement surface 18 to resist further backward forces.

Figure 3:
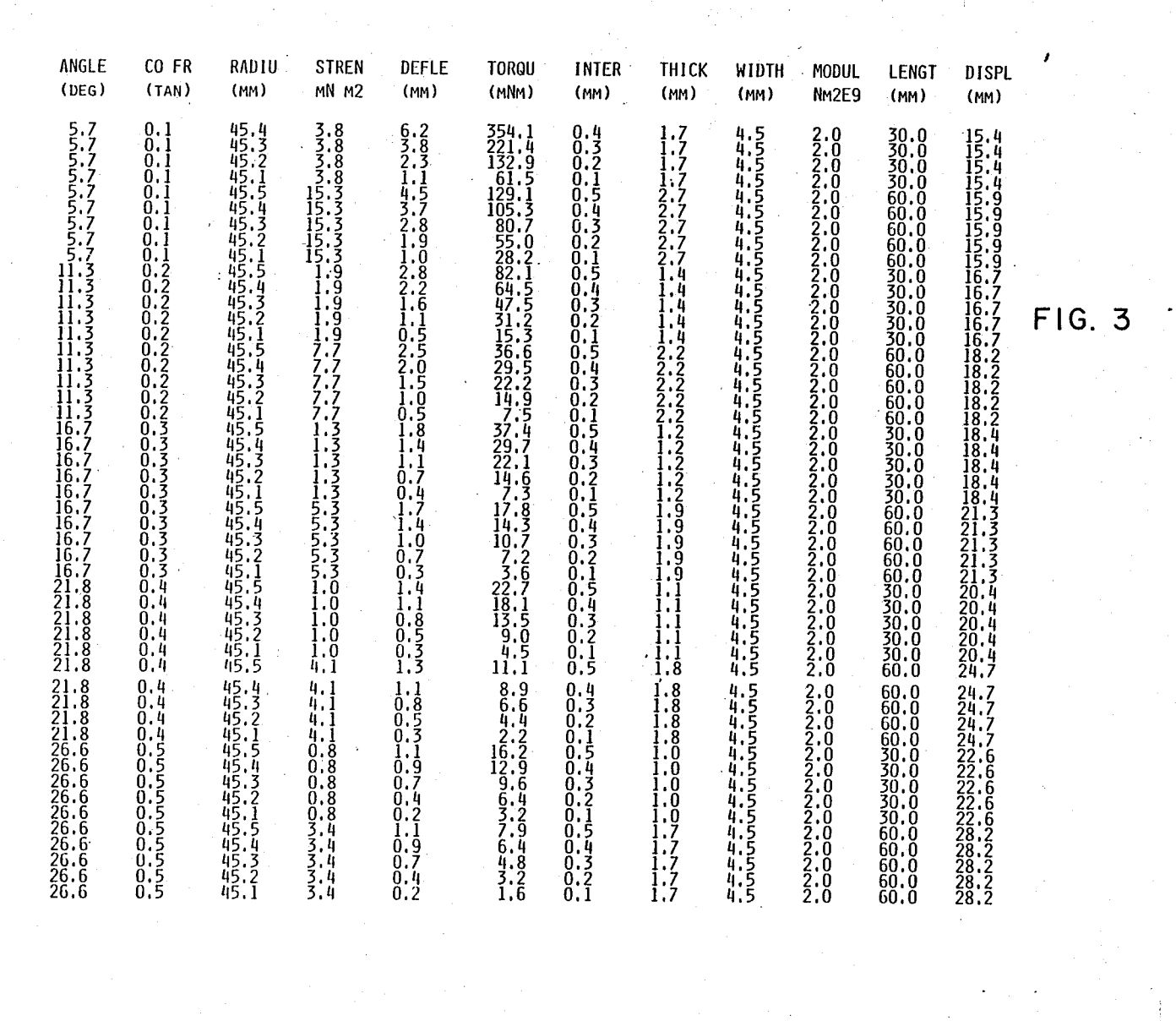

As can be seen from the above description, the characteristics of buckling arm 20 are critical to the proper operation of the present clutch assembly 11. FIG. 3 gives a table showing various parameters for the buckling arms 20. Also, for each row of value in the table the free-wheeling torque due to the clutch assembly 11 is less than 50 mNm. It should be noted that the free-wheeling torque is the torque which motor 52 (FIG. 2) must exert on the spool 50 in addition to torque due to paper tension so that it increments the paper 66 in the forward direction. The first row in the table represents symbols for different parameters while the second row represents the units in which these parameters are measured. Table 1 below is a listing of each symbol and an explanation for each symbol. The symbols are recorded in the first column and the description for each symbol is given in the second column. For example, "Co Fr" represents coefficient of friction. More particularly, this is the coefficient of friction between the primary buckling arm 20 and engagement surface 18. Likewise, "Angle" is Å situated between the buckling arms 20 and their associated radius. Thus, if a designer wishes to design a clutch in which the critical angle between the buckling arms 20 and the engagement surface 18 is approximately 5.7°, then any one of the first nine entries may be used.

TABLE I

| SYMBOL | DESCRIPTION |
| --- | --- |
| Angle | ∅ is the critical angle between the buckling arm 20 and a radius from the center of member 14 to the engagement surface 18. |
| Co FR | Coefficient of friction between buckling arms 20 and rotating cylindrical surface 18 |
| Radius | Distance from tip of buckling arms 20 to center axis |
| Stren | Beam strength related to modulus of elasticity, length, and cross sectional geometry |
| Defle | Deflection of buckling arm tip from free position |
| Torque | Required torque to rotate member 10 in free-wheeling direction |
| Inter | Theoretical interference, buckling arm free position radius minus rotating member radius |
| Thick | Cross sectional thickness of buckling arms 20 |
| Width | Cross sectional width of buckling arms 20 |
| Modul | Modulus of elasticity of buckling arm material |
| Length | Length of buckling arms 20 |
| Displa | Distance from solid end of buckling arms 20 to center axis |

In view of the above, the present invention provides an anti-backup clutch with low free-wheeling torque and extremely high resolution for small backup loads. The clutch further provides exceedingly high locking torque for large backup loads. The clutch has a low part count, long life, low tolerance requirements, and is compatible with robotic assembly.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A clutch assembly comprising:
a first means with a smooth engagement surface thereon; and a second means disposed coaxially with said engagement surface and to rotate relative thereto;
said second means including a hub section with at least a first straight and elongated flexural member extending from said hub section to frictionally engage the smooth engagement surface; and at least a second straight and elongated flexural member extending from said hub section to a zone whereat the end surface of said second straight and elongated flexural member is in spaced alignment with the engagement surface whereby the first flexural member is made to buckle in response to forces outside of a predetermined range and causes the second flexural member to be brought into contact with the engagement surface to resist said forces.

2. The clutch assembly of claim 1 wherein the first flexural member has a relatively thin, narrow and elongated cross-sectional area.

3. The clutch assembly of claim 2 wherein the tangent of the angle formed between the first flexural member and a line extending from the center of the hub section to the engagement surface is greater than the coefficient of friction between the first flexural member and said engagement surface.

4. The clutch assembly of claim 1 wherein the second means is configured in a tripod arrangement.

5. The clutch assembly of claim 4 wherein the tripod arrangement is a unified molded structure.

6. The clutch assembly of claim 1 wherein the second flexural member has a relatively thick wide and elongated cross-sectional area with a hinge disposed in the end whereat the second flexural member is attached to the hub section.

7. A clutch assembly operable for controlling the rotation of a device so that said device rotates freely in a free-wheeling direction and is being restricted from rotation in a non-free wheeling direction, said clutch assembly comprising:
a first means coupled to said device, said first means having a smooth engagement surface thereon;
a second means coaxially mounted to rotate relatively to the first means; said second means having a tripod arrangement with a set of straight elongated primary detent buckling arms riding in continuous contact with the engagement surface and a set of straight elongated secondary detent hinged arms disposed relative to the buckling arms and operable to contact the smooth engagement surface periodically to resist forces that cause the straight primary detent buckling arms to buckle and recede from the smooth engagement surface.

8. An element suitable for coacting with a movable surface of a one-way non-ratchet type clutch mechanism comprising:
a triangular shaped hub section;
a plurality of elongated resilient members configured in a tripod arrangement and integrally coupled to the hub section, said resilient members having a relatively long and narrow cross-section area and operable for riding in continuous engagement with said movable surface to resist forces within a predetermined range; and
a plurality of elongated compliant members configured in a tripod arrangement and integrally coupled to the hub section;
said elongated compliant members being positioned in spaced relation with each of said elongated resilient members and running in a direction parallel thereto whereby buckling of the resilient members causes the elongated compliant members to contact the surface to resist forces that cause buckling of said elongated resilient members.

9. In a printer wherein a takeup spool assembly carrying a print medium is incrementally driven in a first direction so that print lines are positioned in seriatim to a print head, a one-way clutch mechanism for driving said takeup spool assembly comprising:

a substantially circular member having a substantially smooth engagement surface;

fastening means operable for coupling said member to the takeup spool assembly;

a restraining means operable for interacting with said substantially smooth engagement surface and for enabling the takeup spool assembly to rotate in a single direction to provide spacing between print lines; said restraining means having a set of primary detent buckling members operable for riding in continuous contact with the smooth engagement surface and for buckling from the surface for forces exceeding a predetermined range, and a set of secondary detent hinged members disposed relative to the primary members and operable to contact the surface following the buckling of said set of detent buckling members to resist thereafter the forces that cause the buckling of the primary members.

10. A paper handling apparatus suitable for use in a printer comprising:

a spool suitable for supporting a roll of paper thereon;

a pulley firmly coupled to the spool, said pulley having a flat surface on one side facing the spool and a cavity fabricated on the surface opposite to the flat surface;

a ring-like member having an engagement surface thereon and operable for fitting around the perimeter of the cavity;

fastening means operable for coupling said ring-like member to the pulley;

a restraining means mounted at the center of said pulley and operable for interacting with said ring-like member and for enabling the spool with attached paper to rotate in a single direction; said restraining means having a set of elongated primary buckling arms riding in continuous contact with the engagement surface and buckling to recede from said surface only if a force outside of a predetermined range is being applied to cause rotation in an opposite direction, and a set of elongated secondary hinged arms operable for sequentially contacting said engagement surface and resisting rotation in the opposite direction; and means suitable for mounting the restraining means to a frame of said printer.

11. The paper handling apparatus of claim 10 further including;

means coupled to the pulley and operable to rotate said ring-like member relative to the set of primary buckling arms and the set of secondary hinged arms.

* * * * *